US010750405B2

(12) United States Patent
Zhang

(10) Patent No.: US 10,750,405 B2
(45) Date of Patent: Aug. 18, 2020

(54) DATA PACKET SENDING METHOD, DATA PACKET RECEIVING METHOD, DATA PACKET SENDING DEVICE AND DATA PACKET RECEIVING DEVICE

(71) Applicant: ZTE CORPORATION, Shenzhen (CN)

(72) Inventor: Lu Zhang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 16/074,581

(22) PCT Filed: Aug. 30, 2016

(86) PCT No.: PCT/CN2016/097357

§ 371 (c)(1),
(2) Date: Aug. 1, 2018

(87) PCT Pub. No.: WO2017/133234

PCT Pub. Date: Aug. 10, 2017

(65) Prior Publication Data

US 2019/0045396 A1 Feb. 7, 2019

(30) Foreign Application Priority Data

Feb. 3, 2016 (CN) .......................... 2016 1 0078138

(51) Int. Cl.
*H04L 12/801* (2013.01)
*H04L 29/12* (2006.01)
(Continued)

(52) U.S. Cl.
CPC ........... *H04W 28/065* (2013.01); *H04L 29/12* (2013.01); *H04L 61/2507* (2013.01);
(Continued)

(58) Field of Classification Search
CPC ...... H04W 28/065; H04W 4/70; H04L 29/12; H04L 61/2507; H04L 69/163; H04L 69/166; H04L 69/22; H04L 47/36
See application file for complete search history.

(56) References Cited

U.S. PATENT DOCUMENTS 6,721,334 B1 4/2004 Ketcham
7,269,171 B2 9/2007 Poon
(Continued)

FOREIGN PATENT DOCUMENTS

CN 101989889 A 3/2011
CN 102333293 A 1/2012
(Continued)

OTHER PUBLICATIONS

Supplementary European Search Report in European application No. 16889045.7, dated Jan. 29, 2019, 8 pgs.
(Continued)

*Primary Examiner* — Un C Cho
*Assistant Examiner* — Peter K Mak
(74) *Attorney, Agent, or Firm* — Cooper Legal Group, LLC

(57) ABSTRACT

Provided are a data packet sending method, a data packet receiving method, a data packet sending device and a data packet receiving device. The data packet sending method includes: determining a first data packet to be sent to a server; when there are two or more first data packets, aggregating the two or more first data packets into one second data packet; and sending the second data packet to the server.

7 Claims, 17 Drawing Sheets

(51) Int. Cl.
*H04L 29/06* (2006.01)
*H04W 28/06* (2009.01)
*H04W 4/70* (2018.01)
*H04L 12/805* (2013.01)

(52) U.S. Cl.
CPC .......... *H04L 69/163* (2013.01); *H04L 69/166* (2013.01); *H04L 69/22* (2013.01); *H04W 4/70* (2018.02); *H04L 47/193* (2013.01); *H04L 47/36* (2013.01)

(56) References Cited

U.S. PATENT DOCUMENTS 7,457,316 B1 11/2008 Durrant
8,228,861 B1 * 7/2012 Nix .................... H04W 36/00 370/329
2004/0057434 A1 3/2004 Poon
2012/0207168 A1 * 8/2012 Kassi Lahlou ... H04L 29/12358 370/392
2013/0170451 A1 * 7/2013 Krause .................... H04L 69/14 370/329
2013/0182651 A1 * 7/2013 Kelkar ................ H04L 61/2046 370/329
2013/0301569 A1 11/2013 Wang et al.
2014/0089504 A1 * 3/2014 Scholz ................ H04L 41/5032 709/224
2014/0314157 A1 * 10/2014 Hwang .................. H04N 19/89 375/240.27
2017/0155490 A1 6/2017 Wang et al.
2017/0214703 A1 * 7/2017 Tekchandani ........... H04L 63/02
2018/0048567 A1 * 2/2018 Ignatchenko ....... H04L 43/0894
2018/0109941 A1 * 4/2018 Jain ...................... H04W 60/00
2018/0241531 A1 8/2018 Wang et al.
2018/0359214 A1 * 12/2018 Janneteau ........... H04L 61/2514

FOREIGN PATENT DOCUMENTS

| | | | |
|---|---|---|---|
| CN | 103108358 | A | 5/2013 |
| CN | 103391532 | A | 11/2013 |
| CN | 104321995 | A | 1/2015 |
| GB | 2448317 | A | 10/2008 |
| JP | S61296838 | A | 12/1986 |
| JP | S63197148 | A | 8/1988 |
| JP | 2002009832 | A | 1/2002 |
| JP | 2015525017 | A | 8/2015 |
| JP | 2015159495 | A | 9/2015 |

OTHER PUBLICATIONS

International Search Report in international application No. PCT/CN2016/097357, dated Nov. 28, 2016, 2 pgs.

English Translation of the Written Opinion of the International Search Authority in international application No. PCT/CN2016/097357, dated Nov. 28, 2016, 4 pgs.

Corresponding Japanese Patent Application No. 2018-540158, Office Action dated Jun. 10, 2019 with English Translation.

* cited by examiner

DATA PACKET SENDING METHOD, DATA PACKET RECEIVING METHOD, DATA PACKET SENDING DEVICE AND DATA PACKET RECEIVING DEVICE

TECHNICAL FIELD

Embodiments herein relate, but are not limited, to the field of communications, and in particular to a method and device for sending a packet, and a method and device for receiving a packet.

BACKGROUND

With development of science and technology, Internet plays an increasingly vital role in daily life. In an era of networks at present, various types of data may be transmitted using a network. During data transmission, traffic is to be limited for various reasons. To limit traffic, software for data transmission, as well as a related Internet product, may use a basic strategy, such as a leaky-bucket strategy, a token-bucket strategy, etc. With a leaky-bucket algorithm, bursting traffic may be shaped so as to provide a stable traffic for a network. A leaky bucket may be viewed as a queue for a single server with a constant period of serving time. If a leaky bucket (packet cache) overruns, then a packet will be thrown away. A main goal of a leaky-bucket algorithm is to control a rate at which data are injected into a network, to smooth bursting traffic on the network.

According to a token-bucket algorithm, a system will put tokens into a bucket at a constant speed. If a request is to be processed, then first a token has to be acquired from the bucket. When no token is left in the bucket, then a service is refused. Another benefit with a token bucket may be that it is easy to change a speed. A rate at which tokens are put into a bucket may be increased as needed, when a rate is to be increased.

As a leaking rate of a leaky bucket is a fixed parameter, a leaky-bucket algorithm cannot make an individual flow burst to reach a port rate, even where there is no resource conflict (no congestion) in a network. Therefore, under certain circumstances, a leaky-bucket algorithm may not make effective use of a resource of a network. With an ultimate goal to maintain a smooth rate, a leaky-bucket algorithm may be ineffective for traffic of a bursty nature.

A token-bucket algorithm, on the other hand, may be suitable for such traffic of a bursty nature. However, a token-bucket algorithm has its own limitation. First, like a leaky-bucket algorithm, a token-bucket algorithm may as well require a large buffer to store a queue, and thus be more suitable for being run on a large system, such as software of a Personal Computer (PC for short), a website on the Internet, etc. Secondly, a token-bucket algorithm mainly aims at limiting and shaping traffic, and provides no elaboration as to when no token is left in a bucket. Therefore, when high traffic is maintained in a network within a short period of time, a packet-loss rate may still be a factor that impacts quality of transmission, leading to low bandwidth utilization. In addition, compared to a leaky bucket, a token bucket may allow bursting traffic but for a short moment, which essentially still serves for "limiting and shaping" traffic, instead of boosting a rate. A vital topic of a data channel product is concurrent rates. During concurrent uplink and downlink transmissions, more often than not, an uplink rate and a downlink rate thereof cannot reach an individual rate at which an individual upload or an individual download is performed. Neither a leaky-bucket algorithm nor a token-bucket algorithm can implement uplink and downlink rates that reach an individual rate at which an individual upload or an individual download is performed.

In addition, an uplink packet (a packet sent or transmitted uplink) will be subject to multiple strata of processing. For example, considering data transmission in an Internet of Things, also referred to as Machine-Type Communications (MTC for short), an uplink packet will be processed by strata such as a physical stratum, Medium Access Control (MAC for short), Radio Link Control (RLC for short), Packet Data Convergence Protocol (PDCP for short) of a radio protocol stack, etc. A data body of a small packet may be no major portion of a size of the whole packet. A header of each packet may be processed stratum by stratum. This may lower work efficiency of a radio protocol stack, causing slow data transmission.

No effective solution for the slow data transmission has been proposed to date.

SUMMARY

Embodiments herein provide a method and device for sending a packet, and a method and device for receiving a packet, capable of at least avoiding the slow data transmission in related art.

According to an aspect of embodiments herein, a method for sending a packet includes: determining a first packet to be sent to a server; in response to there being two or more first packets, aggregating the two or more first packets into a second packet; and sending the second packet to the server.

In an embodiment, the aggregating the two or more first packets into a second packet may include: translating a source Internet Protocol (IP) address of each of the two or more first packets into a predetermined IP address; aggregating the two or more first packets having gone through source IP address translation into the second packet, and setting a source address of the second packet as the predetermined IP address.

In an embodiment, the aggregating the two or more first packets having gone through source IP address translation into the second packet may include: padding different data fields in the second packet respectively with data in the two or more first packets having gone through source IP address translation.

In an embodiment, the padding different data fields in the second packet respectively with data in the two or more first packets having gone through source IP address translation may include: padding different data fields with a same length in the second packet respectively with the data in the two or more first packets having gone through source IP address translation. A data field padded with data in each of the first packets may include at least one of: first identification information for identifying a length of the data in the first packet, second identification information for identifying a source IP address of the first packet before the source IP address translation, or padding bits. When the length of the data in the first packet is less than the length of the data field, a portion in the data field not padded with the data in the first packets may be padded with the padding.

According to an aspect of embodiments herein, a method for sending a packet includes: determining a first packet to be sent to a server; and in response to the first packet being an acknowledging (ACK) packet, sending the ACK packet using a Non-Access-Stratum-Protocol Data Unit (NAS-PDU).

In an embodiment, the sending the ACK packet using a Non-Access-Stratum-Protocol Data Unit (NAS-PDU) may include: bearing the ACK packet in the NAS-PDU; and sending the NAS-PDU bearing the ACK packet.

According to an aspect of embodiments herein, a method for receiving a packet includes: receiving a second packet sent by User Equipment (UE); and acquiring two or more first packets aggregated in the second packet by parsing the second packet.

In an embodiment, the acquiring two or more first packets aggregated in the second packet by parsing the second packet may include: determining, by parsing two or more data fields in the second packet, a length of data in a first packet with which each of the two or more data fields in the second packet is padded; and acquiring, according to the length determined, the data in the first packet with which each of the two or more data fields in the second packet is padded.

In an embodiment, the determining, by parsing two or more data fields in the second packet, a length of data in a first packet with which each of the two or more data fields in the second packet is padded may include: acquiring first identification information for included in the data field by parsing the two or more data fields in the second packet, and determining, according to the acquired first identification information, the length of the data in the first packet with which each of the data fields in the second packet is padded. The first identification information may identify the length of the data in the first packet.

In an embodiment, the method may further include: after the parsing two or more data fields in the second packet, determining, according to second identification information included in the data field acquired by parsing the two or more data fields in the second packet, a source Internet Protocol (IP) address of the first packet before the source IP address translation. The second identification information may identify the source IP address of the first packet before the source IP address translation.

According to an aspect of embodiments herein, a device for sending a packet includes a first determining module, an aggregating module, and a first sending module. The first determining module is arranged for: determining a first packet to be sent to a server. The aggregating module is arranged for: in response to there being two or more first packets, aggregating the two or more first packets into a second packet. The first sending module is arranged for: sending the second packet to the server.

In an embodiment, the aggregating module may include a translating unit and an aggregating unit. The translating unit may be arranged for: translating a source Internet Protocol (IP) address of each of the two or more first packets into a predetermined IP address. The aggregating unit may be arranged for: aggregating the two or more first packets having gone through source IP address translation into the second packet, and setting a source address of the second packet as the predetermined IP address.

In an embodiment, the aggregating unit may include a padding sub-unit arranged for: padding different data fields in the second packet respectively with data in the two or more first packets having gone through source IP address translation.

In an embodiment, the padding sub-unit may include a padding secondary sub-unit arranged for: padding different data fields with a same length in the second packet respectively with the data in the two or more first packets having gone through source IP address translation. A data field padded with data in each of the first packets may include at least one of: first identification information for identifying a length of the data in the first packet, second identification information for identifying a source IP address of the first packet before the source IP address translation, or padding bits. When the length of the data in the first packet is less than the length of the data field, a portion in the data field not padded with the data in the first packets may be padded with the padding.

According to an aspect of embodiments herein, a device for sending a packet includes a second determining module and a second sending module. The second determining module is arranged for: determining a first packet to be sent to a server. The second sending module is arranged for: in response to the first packet being an acknowledging (ACK) packet, sending the ACK packet using a Non-Access-Stratum-Protocol Data Unit (NAS-PDU).

In an embodiment, the second sending module may include a bearing unit and a sending unit. The bearing unit is arranged for: bearing the ACK packet in the NAS-PDU. The sending unit is arranged for: sending the NAS-PDU bearing the ACK packet.

According to an aspect of embodiments herein, a device for receiving a packet includes a receiving module and an acquiring module. The receiving module is arranged for: receiving a second packet sent by User Equipment (UE). The acquiring module is arranged for: acquiring two or more first packets aggregated in the second packet by parsing the second packet.

In an embodiment, the acquiring module may include a first determining unit and an acquiring unit. The first determining unit is arranged for: determining, by parsing two or more data fields in the second packet, a length of data in a first packet with which each of the two or more data fields in the second packet is padded. The acquiring unit is arranged for: acquiring, according to the length determined, the data in the first packet with which each of the data fields in the second packet is padded.

In an embodiment, the first determining unit may include a determining sub-unit arranged for: acquiring first identification information for included in the data field by parsing the two or more data fields in the second packet, and determining, according to the acquired first identification information, the length of the data in the first packet with which each of the data fields in the second packet is padded. The first identification information may identify the length of the data in the first packet.

In an embodiment, the device may further include a second determining unit arranged for: after the two or more data fields in the second packet are parsed, determining, according to second identification information included in the data field acquired by parsing the two or more data fields in the second packet, a source Internet Protocol (IP) address of the first packet before the source IP address translation. The second identification information may identify the source IP address of the first packet before the source IP address translation.

According to an aspect of embodiments herein, a computer-readable storage medium has stored therein computer-executable instructions for executing any aforementioned method for configuring a resource.

With a technical solution according to embodiments herein, a first packet to be sent to a server is determined; when there are two or more first packets, the two or more first packets are aggregated into a second packet; and the second packet is sent to the server, providing a solution for the slow data transmission in related art, thus increasing a data transmission rate.

Other characteristics and advantages of embodiments herein may be illustrated and partially become clear in detailed description made below, or may be understood by implementing the present disclosure. A goal and other advantages of embodiments herein may be implemented and acquired by a structure specified in the specification, claims, and the drawings.

Any other aspect herein may be understood upon viewing the drawings and the detailed description.

BRIEF DESCRIPTION OF THE DRAWINGS

A drawing illustrated herein is provided for further understanding of an embodiment herein, and forms a portion of the present disclosure. An illustrative embodiment herein and description thereof are for explaining the present disclosure, and may not limit the present disclosure improperly.

DETAILED DESCRIPTION

The present disclosure is further elaborated below with reference to the drawings and embodiments. Note that embodiments herein and features thereof can be combined with each other as long as no conflict results from the combination.

Note that a term such as "first", "second", etc., used herein is but for differentiating similar objects, instead of denoting any specific order.

Figure 1:
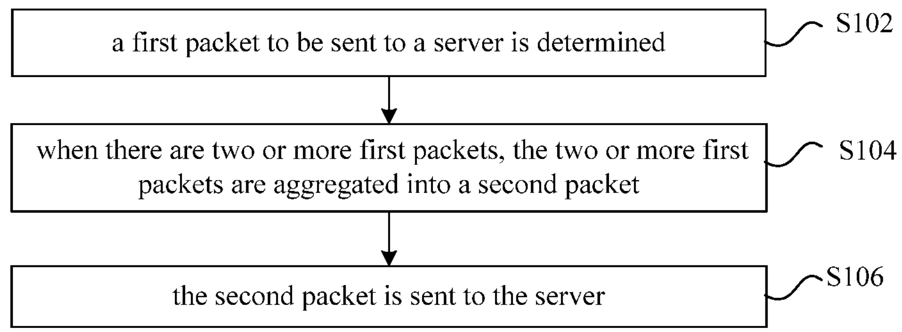
FIG. 1 is a flowchart of a method for sending a packet according to an embodiment herein.

FIG. 1 is a flowchart of a method for sending a packet according to an embodiment herein. As shown in FIG. 1, the flow includes steps as follows.

In S102, a first packet to be sent to a server is determined.

In S104, when there are two or more first packets, the two or more first packets are aggregated into a second packet.

In S106, the second packet is sent to the server.

With the steps, two or more first packets are aggregated and sent as a second packet, avoiding slow data transmission caused by a requirement in related art that a header of each first packet is to be processed stratum by stratum, thus increasing a data transmission rate.

The two or more first packets may be aggregated into the second packet as follows. Any source Internet Protocol (IP) address of the two or more first packets may be translated into a predetermined IP address. The two or more first packets having gone through the source IP address translation may be aggregated into the second packet. A source address of the second packet may be set as the predetermined IP address. The source IP address may be a pre-allocated IP address in a Local Area Network (LAN). The predetermined IP address may be a public IP address of gateway equipment. A destination IP address of each first packet may be identical, namely, the IP address of the server. Therefore, while setting the original address of the second packet as the predetermined IP address, the destination address of the second packet may be set as the IP address of the server.

The two or more first packets having gone through the source IP address translation may be aggregated into the second packet as follows. Different data fields in the second packet may be padded respectively with data in the two or more first packets having gone through the source IP address translation. The second packet may be set to include multiple data fields of identical or different lengths. The length of a data field may be set flexibly. For example, the length of each data field may be set as 100 bytes.

The different data fields in the second packet may be padded respectively with the data in the two or more first packets having gone through the source IP address translation as follows. Different data fields with a same length in the second packet may be padded respectively with the data in the two or more first packets having gone through the source IP address translation. A data field padded with the data in the first packets may include at least one of: first identification information for identifying a length of the data in the first packets, second identification information for identifying a source IP address of the first packets before the source IP address translation, or padding bits. When the length of the data in the first packets is less than the length of the data field, a portion in the data field not padded with the data in the first packets may be padded with the padding. When the data field carries but the first identification information, a receiver, such as the server or a fragmenting device, may determine the length of effective data in the data field (i.e., the data in the first packets) according to first identification information, and thereby parse but a length of the data field corresponding to the effective data to acquire but the effective data.

When the data field carries but the padding, it means that the field actually contains no effective information. Namely, the field is padded with no data of the first packets. The receiver does not have to parse the field. Such a case generally occurs but when the aggregating unit has specified, in aggregating the first packets, a large second packet with a large number of fields, while there are but a few first packets forming a number of fields less than the number of fields provided by the second packet. In this case, any unpadded field at the tail of the second packet will be padded with the padding.

The first identification information, the second identification information, and the padding may be may combined in many ways.

For example, it may be set that the data fields may be of identical or different sizes. Therefore, the data field may include no padding, each field may contain data of the first identification information, the second identification information and information on the data of the first packets.

Alternatively, there may be no first identification information for specifying the length of the first packet. A field of the second packet may contain but the data of the first packet.

Both cases may be implemented, making the most of space of a data field.

Alternatively, there is no second identification information for identifying the source address of the first packet before the source IP address translation. This may occur when the receiver does not need to know the source address of the first data field before the source IP address translation. For example, in a client—server mode, the server, namely, the receiver, may differentiate, via a port number in a Transmission Control Protocol (TCP) header in a first packet, different first packets sent by different MTC UE, without the need to know the source IP address of the first data field before the source IP address translation.

A combination is described below as an example. For example, the length of each data field in the second packet may be 100 bytes. When the size of the data in the first packet with which each of the data fields in the second packet is to be padded is less than 100 bytes, a flag bit may be set in the data field. The flag bit may identify the size of the packet with which each of the data fields is padded. The flag bit may be set at the first byte of the data field. In this way, the receiver having received the second packet may learn the accurate length of effective data in a data field, and then parse the original packet. Note that generally the length of the data in the first packet with which each of the data fields is padded will be less than the data field. A portion in a data field not fully padded may be padded with padding bits. When the size of the data of a first packet to be sent is greater than the length of a data field in the second packet, the second packet may not be padded with the data of the first packet to be sent. Instead, the first packet to be sent may be sent to a receiving end in an existing mode.

An aforementioned embodiment mainly describes how multiple small packets (corresponding to the first packets) are aggregated into a large packet (corresponding to the second packet). The aforementioned embodiment may apply in an Internet of Things. The aforementioned embodiment may be illustrated below with reference to an Internet of Things.

A requirement of a system of an Internet of Things for UE, as well as particularity of an Internet of Things in terms of data transmission, is described first. UE of an Internet of Things usually has characteristics as follows.

When working normally, UE of an Internet of Things may have to be low-cost, in terms of such as equipment power consumption, network load, etc.

UE of an Internet of Things may often work in a mobile state or under poor signal coverage. Meanwhile, data may have to be transmitted at low cost.

UE of an Internet of Things may often be characterized by small data transmission. For example, multiple sensors may send collected small packets discretely to an MTC server. Such frequent or discrete small packet transmission usually will lead to poor utilization of a resource of a 3GPP system.

Given characteristics of small packet transmission in MTC, transmission of small amount of data may be optimized by "packet aggregation", increasing efficiency in small data transmission, lowering cost. Such packet aggregation is advantageous mainly for reasons as follows. An uplink packet will be processed by strata such as a physical stratum, MAC, RLC, PDCP of a radio protocol stack, etc. A data body of a small packet may be no major portion of a size of the whole packet. A header of each packet may be processed stratum by stratum. This no doubt may lower work efficiency of a radio protocol stack. After the small packet aggregation, a large packet may be generated from multiple small packets, with but one header, which will substantially increase efficiency in processing by a protocol stack.

Figure 2:
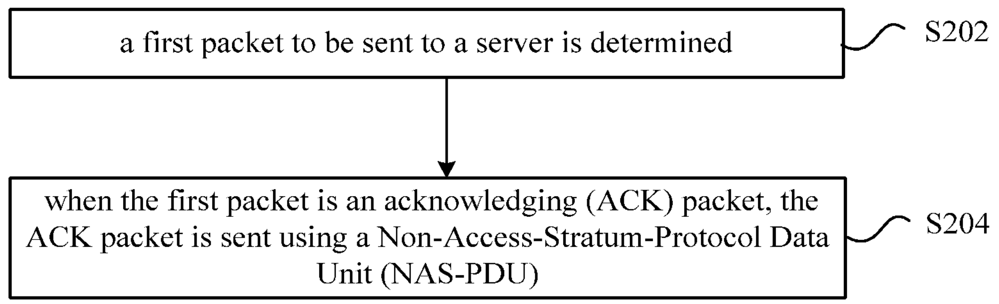
FIG. 2 is a flowchart of a method for sending a packet according to an embodiment herein.

FIG. 2 is a flowchart of a method for sending a packet according to an embodiment herein. As shown in FIG. 2, the flow includes steps as follows.

In S202, a first packet to be sent to a server is determined.

In S204, when the first packet is an acknowledging (ACK) packet, the ACK packet is sent using a Non-Access-Stratum-Protocol Data Unit (NAS-PDU).

With the steps, an ACK packet is sent using an NAS-PDU, implementing ACK transmission by a control plane, avoiding any impact on a rate of downlink TCP data transmission, providing a solution for the slow data transmission in related art, thus increasing a data transmission rate.

The ACK packet may be sent using a Non-Access-Stratum-Protocol Data Unit (NAS-PDU for short) as follows. The ACK packet may be borne in the NAS-PDU. The NAS-PDU bearing the ACK packet may be sent. The ACK packet may be response fed back for downlink data, such as Transmission Control Protocol (TCP for short) data. The embodiment is illustrated with an Internet of Things. Concurrent data transmission (concurrent uplink and downlink transmissions) may burst within a period of time. For traditional data UE, a main user service is basically a downlink service, such as video playing, file downloading, etc. A downlink peak rate may be an indicator most concerned by a user. An amount of data to be transmitted uplink may be small. A required concurrent peak rate is low. However, things are different with an Internet of Things, where concurrent uplink and downlink transmissions will often occur, with both uplink and downlink peak rates to meet a requirement. According to an embodiment herein, such a peak rate may be optimized without increasing transmit power. According to an embodiment herein, an uplink ACK small packet, namely, an ACK packet, message may be transferred to a network by signaling. When UE is working, a system environment, such as temperature, Key Performance Indicators (KPI for short) of a signal in a cell, such as a signal strength, a Signal-to-Noise Ratio (SNR), etc., may be detected. The rate of downlink TCP data may be controlled by controlling the speed of uplink ACK transmission. Cost in data sending may be lowered at high temperature with a weak signal. Based on the same principle, uplink and downlink concurrent rates may be increased substantially with no additional boost in transmit power.

Figure 3:
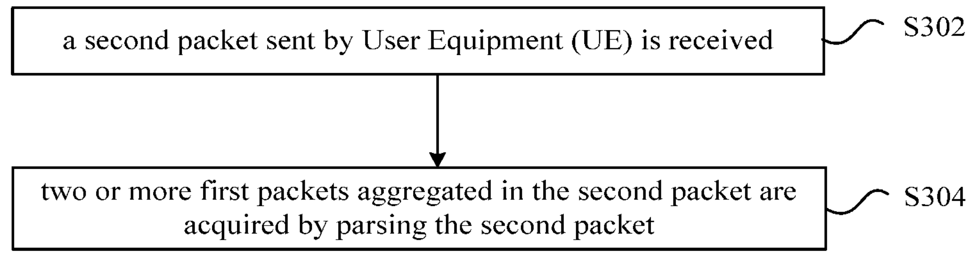
FIG. 3 is a flowchart of a method for receiving a packet according to an embodiment herein.

FIG. 3 is a flowchart of a method for receiving a packet according to an embodiment herein. As shown in FIG. 3, the flow includes steps as follows.

In S302, a second packet sent by User Equipment (UE) is received.

In S304, two or more first packets aggregated in the second packet are acquired by parsing the second packet.

With the steps, two or more first packets aggregated in a second packet may be received. Two or more first packets are aggregated and sent as a second packet, avoiding slow data transmission caused by a requirement in related art that a header of each first packet is to be processed stratum by stratum, such that a receiving end may receive multiple first packets faster, providing a solution for the slow data transmission in related art, thus increasing a data transmission rate.

The two or more first packets aggregated in the second packet may be acquired by parsing the second packet as follows. A length of data in a first packet with which each of the two or more data fields in the second packet is padded may be determined by parsing two or more data fields in the second packet. The data in the first packet with which each of the data fields in the second packet is padded may be acquired according to the length determined. The second packet may be padded with multiple first packets (i.e., the two or more first packets). One first packet may correspond to one data field in the second packet. Each data field may contain a flag bit (corresponding to first identification information) identifying the length of a packet. Therefore, the accurate length of effective data in a data field in the second packet may be learned by parsing the data field in the second packet. Then, an original first packet may be parsed.

A length of data in a first packet with which each of the two or more data fields in the second packet is padded may be determined by parsing the two or more data fields in the second packet as follows. First identification information for included in the data field may be acquired by parsing the two or more data fields in the second packet. The length of the data in the first packet with which each of the data fields in the second packet is padded may be determined according to the acquired first identification information. The first identification information may identify the length of the data in the first packet. Each data field in the second packet may include the first identification information for identifying the length of effective data.

After the two or more data fields in the second packet have been parsed, a source Internet Protocol (IP) address of the first packet before the source IP address translation may be determined according to second identification information included in the data field acquired by parsing the two or more data fields in the second packet. The second identification information may identify the source IP address of the first packet before the source IP address translation. In this way, a receiver may know the original source IP of each first packet.

To send an uplink packet, when a packet is to be sent while a signal is weak, the packet may be cached to be sent when quality of the signal increases, thereby to some extent relieving a signaling load of packet sending with a weak signal.

With description to aforementioned implementation, those skilled in the art may clearly know that the method according to an embodiment herein may be implemented by software plus a necessary general-purpose hardware platform, or by hardware (more often than not by the former, though). Based on such an understanding, the essential part or a part contributing to prior art of the technical solution of an embodiment herein may appear in form of a software product, which software product is stored in storage media, such as Read Only Memory (ROM), Random Access Memory (RAM), a magnetic disk, a CD, etc., and includes a number of instructions for allowing UE (such as a mobile phone, a personal computer, a server, network equipment, etc.) to execute a method according to an embodiment herein.

An embodiment herein further provides a device for sending a packet for implementing an embodiment and implementation described, which will not be repeated. As used below, a "module" may implement a combination of hardware and/or software of predetermined function. Although a device according to an embodiment below may be implemented by software, implementation by hardware or a combination of software and hardware may be conceived.

Figure 4:
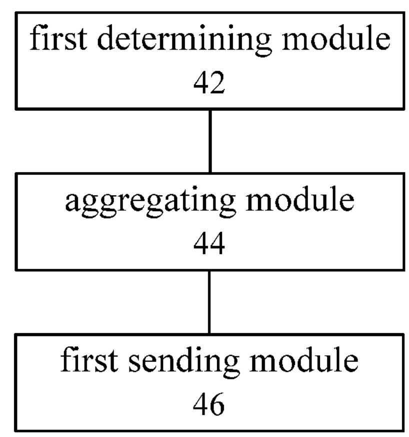
FIG. 4 is a diagram of a structure of a device for sending a packet according to an embodiment herein.

FIG. 4 is a diagram of a structure of a device for sending a packet according to an embodiment herein. As shown in FIG. 4, the device includes a first determining module 42, an aggregating module 44, and a first sending module 46. The device is described below.

The first determining module 42 is arranged for: determining a first packet to be sent to a server. The aggregating module 44 is connected to the first determining module 42 and is arranged for: in response to there being two or more first packets, aggregating the two or more first packets into a second packet. The first sending module 46 is connected to the aggregating module 44 and is arranged for: sending the second packet to the server.

Figure 5:
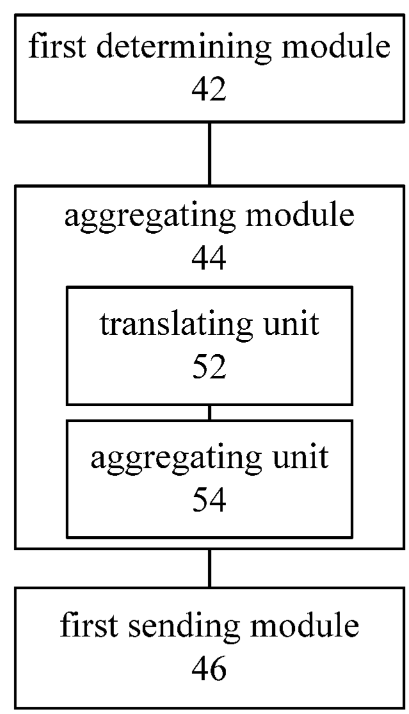
FIG. 5 is a diagram of a structure of an aggregating module 44 in a device for sending a packet according to an embodiment herein.

FIG. 5 is a diagram of a structure of an aggregating module 44 in a device for sending a packet according to an embodiment herein. As shown in FIG. 5, the aggregating module 44 may include a translating unit 52 and an aggregating unit 54. The aggregating module 44 is described as follows.

The translating unit 52 may be arranged for: translating any source Internet Protocol (IP) address of the two or more first packets into a predetermined IP address. The aggregating unit 54 may be connected to the translating unit 52 and may be arranged for: aggregating the two or more first packets having gone through the source IP address translation into the second packet, and setting a source address of the second packet as the predetermined IP address.

Figure 6:
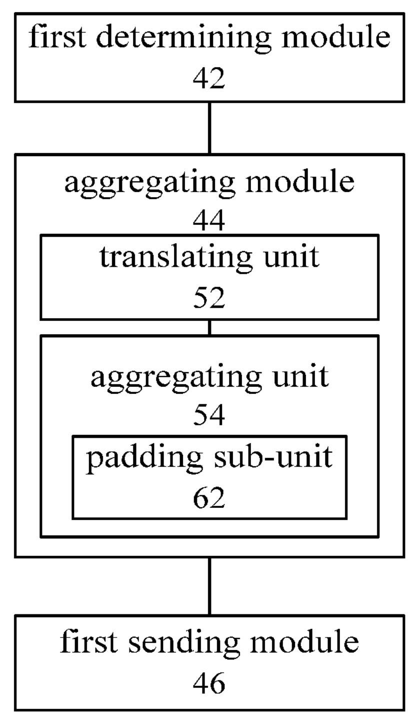
FIG. 6 is a diagram of a structure of an aggregating unit 54 in a device for sending a packet according to an embodiment herein.

FIG. 6 is a diagram of a structure of an aggregating unit 54 in a device for sending a packet according to an embodiment herein. As shown in FIG. 6, the aggregating unit 54 may include a padding sub-unit 62. The padding sub-unit 62 is described as follows.

The padding sub-unit 62 may be arranged for: aggregating the two or more first packets having gone through the source IP address translation into a large packet by padding different data fields in the second packet respectively with data in the two or more first packets having gone through the source IP address translation.

Figure 7:
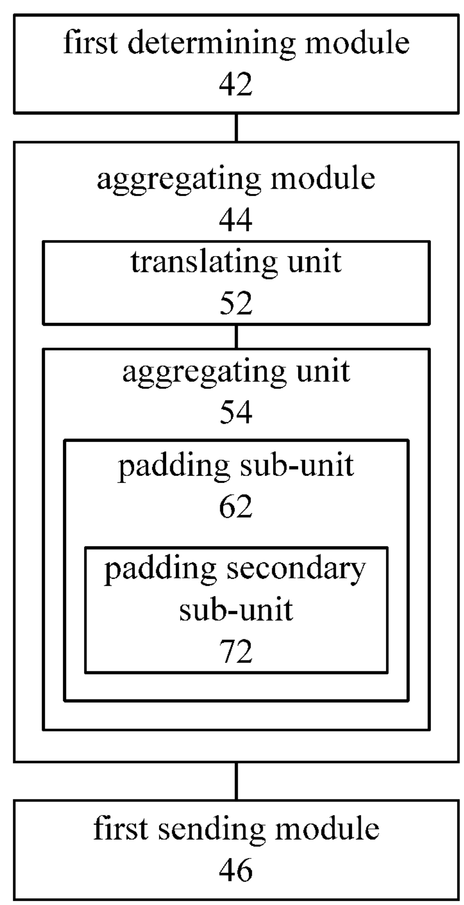
FIG. 7 is a diagram of a structure of a padding sub-unit 62 in a device for sending a packet according to an embodiment herein.

FIG. 7 is a diagram of a structure of a padding sub-unit 62 in a device for sending a packet according to an embodiment herein. As shown in FIG. 7, the padding sub-unit 62 may include a padding secondary sub-unit 72. The padding secondary sub-unit 72 is described as follows.

The padding secondary sub-unit 72 may be arranged for: padding different data fields with a same length in the second packet respectively with the data in the two or more first packets having gone through the source IP address translation. A data field padded with the data in the first packets may include at least one of: first identification information for identifying a length of the data in the first packets, second identification information for identifying a source IP address of the first packets before the source IP address translation, or padding bits. When the length of the data in the first packets is less than the length of the data field, a portion in the data field not padded with the data in the first packets may be padded with the padding.

Figure 8:
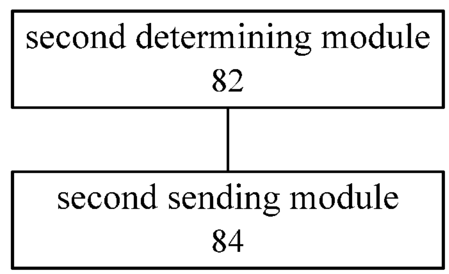
FIG. 8 is a diagram of a structure of a device for sending a packet according to an embodiment herein.

FIG. 8 is a diagram of a structure of a device for sending a packet according to an embodiment herein. As shown in FIG. 8, the device includes a second determining module 82 and a second sending module 84. The device is described as follows.

The second determining module 82 is arranged for: determining a first packet to be sent to a server. The second sending module 84 is connected to the second determining module 82 and is arranged for: in response to the first packet being an acknowledging (ACK) packet, sending the ACK packet using a Non-Access-Stratum-Protocol Data Unit (NAS-PDU).

Figure 9:
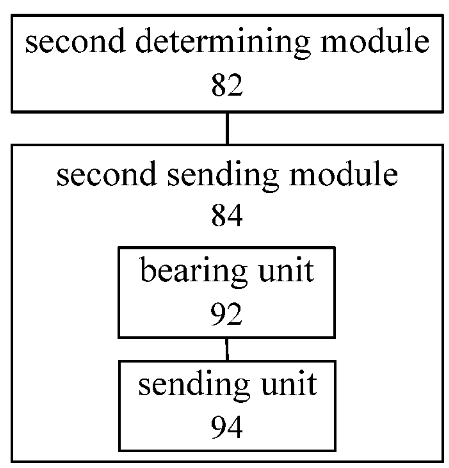
FIG. 9 is a diagram of a structure of a second sending module 84 in a device for sending a packet according to an embodiment herein.

FIG. 9 is a diagram of a structure of a second sending module 84 in a device for sending a packet according to an embodiment herein. As shown in FIG. 9, the second sending module 84 may include a bearing unit 92 and a sending unit 94. The second sending module 84 is described as follows.

The bearing unit 92 may be arranged for: bearing the ACK packet in the NAS-PDU. The sending unit 94 may be connected to the bearing unit 92 and may be arranged for sending the NAS-PDU bearing the ACK packet.

Figure 10:
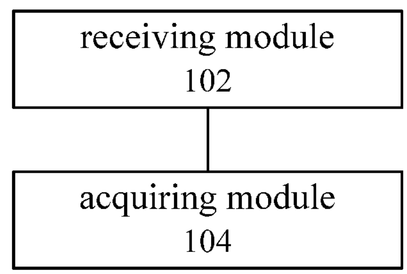
FIG. 10 is a diagram of a structure of a device for receiving a packet according to an embodiment herein.

FIG. 10 is a diagram of a structure of a device for receiving a packet according to an embodiment herein. As shown in FIG. 10, the device includes a receiving module 102 and an acquiring module 104. The device is described below.

The receiving module 102 is arranged for: receiving a second packet sent by User Equipment (UE). The acquiring module 104 is connected to the receiving module 102 and is arranged for: acquiring two or more first packets aggregated in the second packet by parsing the second packet.

Figure 11:
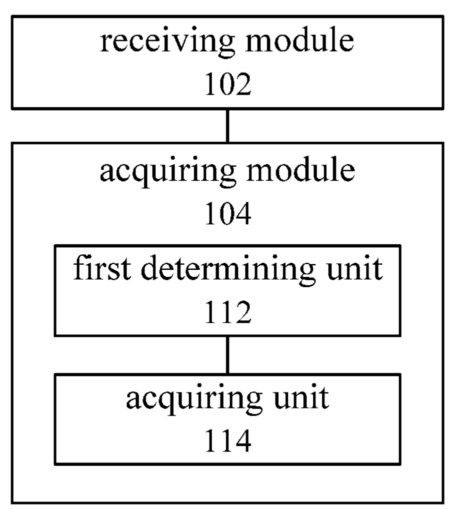
FIG. 11 is a diagram of a structure of an acquiring module 104 in a device for receiving a packet according to an embodiment herein.

FIG. 11 is a diagram of a structure of an acquiring module 104 in a device for receiving a packet according to an embodiment herein. As shown in FIG. 11, the acquiring module 104 may include a first determining unit 112 and an acquiring unit 114. The acquiring module 104 is described as follows.

The first determining unit 112 may be arranged for: determining, by parsing two or more data fields in the second packet, a length of data in a first packet with which each of the data fields in the second packet is padded. The acquiring unit 114 may be connected to the first determining unit 112 and may be arranged for: acquiring, according to the length determined, the data in the first packet with which each of the data fields in the second packet is padded.

Figure 12:
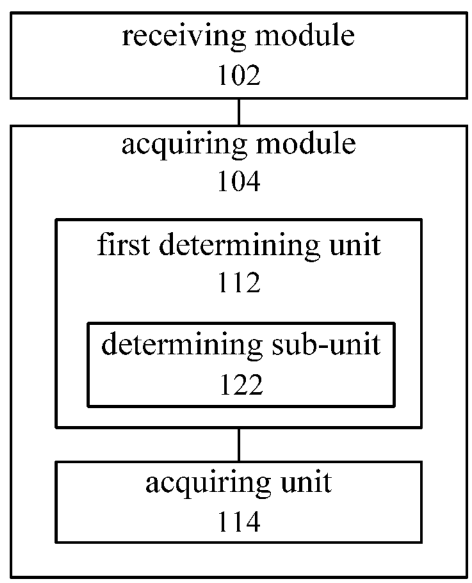
FIG. 12 is a diagram of a structure of a first determining unit 112 in a device for receiving a packet according to an embodiment herein.

FIG. 12 is a diagram of a structure of a first determining unit 112 in a device for receiving a packet according to an embodiment herein. As shown in FIG. 12, the first determining unit 112 may include a determining sub-unit 122. The determining sub-unit 122 is described as follows.

The determining sub-unit 122 may be arranged for: acquiring first identification information for included in the data field by parsing the two or more data fields in the second packet, and determining, according to the acquired first identification information, the length of the data in the first packet with which each of the data fields in the second packet is padded. The first identification information may identify the length of the data in the first packet.

Figure 13:
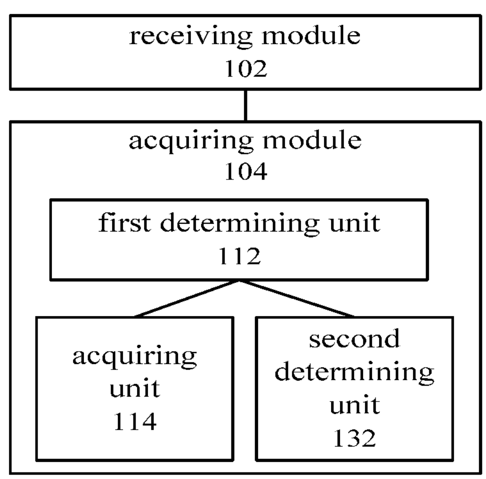
FIG. 13 is a diagram of a structure of an acquiring module 104 in a device for receiving a packet according to an embodiment herein.

FIG. 13 is a diagram of a structure of an acquiring module 104 in a device for receiving a packet according to an embodiment herein. As shown in FIG. 13, in addition to the modules shown in FIG. 11, the acquiring module 104 may further include a second determining unit 132. The acquiring module 104 is described as follows.

The second determining unit 132 may be connected to the first determining unit 112 and may be arranged for: after the two or more data fields in the second packet are parsed, determining, according to second identification information included in the data field acquired by parsing the two or more data fields in the second packet, a source Internet Protocol (IP) address of the first packet before the source IP address translation. The second identification information may identify the source IP address of the first packet before the source IP address translation.

The device according to an embodiment herein may be illustrated below with reference to an Internet of Things.

A module in a physical network involved in an embodiment herein mainly may include modules as follows.

A Packet Aggregation Module (PAM for short, corresponding to the aggregating unit 54) may be located between a Network Address Translation (NAT for short) module and an air interface. The PAM may be arranged for aggregating multiple small packets (corresponding to the first packets) sent by multiple UE (such as sensors with private IP addresses) to one application server in an Internet of Things (MTC Server) into a data block, storing the data block in a newly built large IP packet (corresponding to the second packet), and transmitting the large IP packet to a network. There may be various ways of aggregation based on the thought. A simple, efficient way is proposed in the implementation. Namely, the data portion of the newly built large IP packet may be logically divided into fields of identical sizes of a number of (such as 100) bytes. During aggregation, the fields may be padded with content of each small IP packet. If a field is not fully padded with a small packet, any unpadded portion thereof will be padded with padding bits. Note that the embodiment may apply to a scene where multiple UE are allocated with IP addresses in a Local Area Network (LAN) of one network segment, and may send IP packets to one server. If there are multiple servers, then a route sent to one server may be aggregated. Aggregation may occur at a rear end of NAT. After NAT processing, source IP addresses in headers of multiple small IP packets may have changed into public IP addresses allocated to UE by a core network. The public IP addresses of multiple UE may be identical, while destination addresses, namely, that of an MTC server, are identical, too. Therefore, the source and destination IP addresses of a newly built large IP packet may be acquired by copying the source and destination IP addresses of a small packet.

A Packet Fragmentation Module (PFM for short, corresponding to the acquiring module 104) may be logically located between a core network of an operator and an application server in an Internet of Things. The PFM may be implemented in a network of an operator or on an MTC Server. The PFM may serve to generate original small packets by fragmenting or de-aggregating an aggregated IP packet sent by UE, and then provide the original small packets to a TCP/IP protocol stack of the original flow of an MTC application. Fragmentation may be the inverse of the aggregation. Content of data portion in the large IP packet may then be parsed field by field.

A traffic regulator may control enabling of the function in order to increase network compatibility of a system. After UE has been switched out of an environment of an Internet of Things in 3rd Generation partnership project (3GPP for short), such as Cat1, Cat0, or Long Term Evolution-Machine to Machine (LTE-M for short), an original work flow will not be impacted.

A traffic regulating module (Traffic Regulator Process, corresponding to the second sending module 84) may serve for two functions. One is to detect a condition of a work environment. The other is to send, via a function of "small data transmission by signaling" in an Internet of Things in 3GPP, an uplink message acknowledging a downlink TCP packet (TCP ACK) to a network in a message body of NAS signaling.

The present disclosure is described below with reference to respective embodiments.

Packet Aggregation

Figure 14:
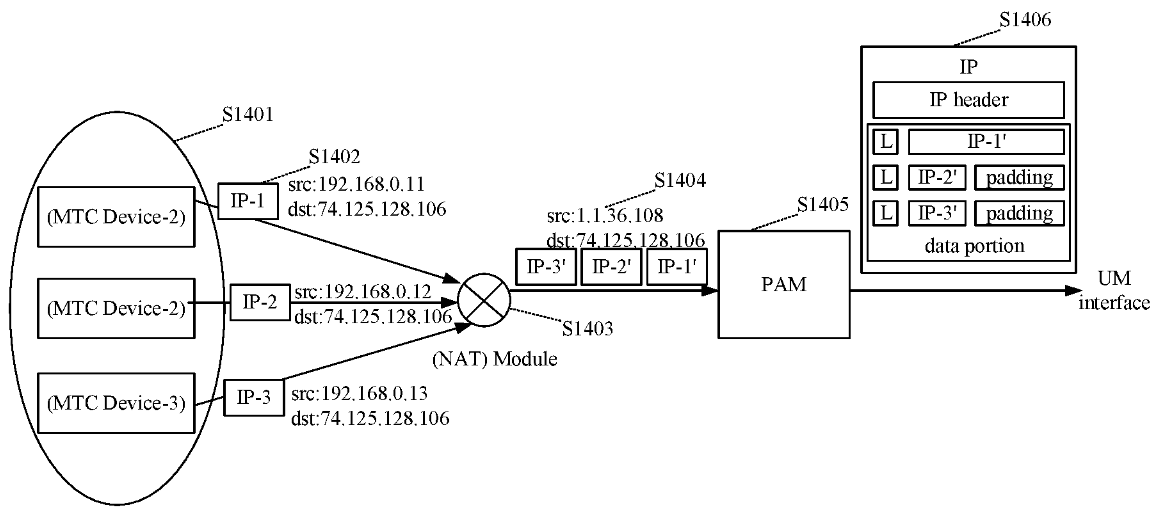
FIG. 14 is a flowchart of a method for aggregating a packet according to an embodiment herein.

Refer to FIG. 14, which is a flowchart of a method for aggregating a packet according to an embodiment herein. An embodiment herein provides a method for aggregating uplink small packets. As shown in FIG. 14, the flow may include steps as follows.

In S1401, an MTC device may be allocated with an IP address, such as of a section 192.168.0.x, for example. There may usually be multiple equipment in an MTC system, which may be allocated with IP addresses in a Local Area Network (LAN).

In S1402, an MTC device may send an uplink packet to a network. Listed in FIG. 14 are three packets IP-1, IP-2, and IP-3, of which the IP-1 is the largest, and the IP-3 is the smallest. Three equipment may send the packets to an MTC Server with an address 74.125.128.106.

In S1403, a Network Address Translation (NAT) module finally will translate the source IP addresses of the three packets into a public IP address allocated to gateway equipment by a 3GPP system, such as 1.1.36.108, for example.

In S1404, an NAT-translated IP packet may be sent to an air interface side.

In S1405, a Packet Aggregation Module (PAM) module, which is one of the core modules herein, may serve to form a large packet described below by aggregating multiple small packets, and then send the large packet to a 3GPP network. Note a packing code here may be 100, for example. Namely, the aggregation may involve packets of lengths no greater than 100 bytes. Padding bits may be attached to a packet less than 100 bytes. A data field of the large packet may be padded with each 100 bytes, which serve as a field. A first byte L in each field may be the length of effective content of an IP packet in the each field. The first byte may be set, such that an original small IP packet may be separated effectively from a following padding during aggregation. The mechanism of the packet aggregation is to help a Fragmentation module in byte addressing, so as to fragment data in the large IP packet into the original IP packets. What listed here is but one way of aggregation. There may be other ways of aggregation and other ways of fragmentation, which however, may be details at a level of program designing that will not be elaborated here.

In S1406, the large IP packet acquired by the PAM module by aggregation may then be sent to a network side via an air interface (Um interface). Multiple small packets may be located in the data portion of the IP packet.

Packet Fragmentation

Figure 15:
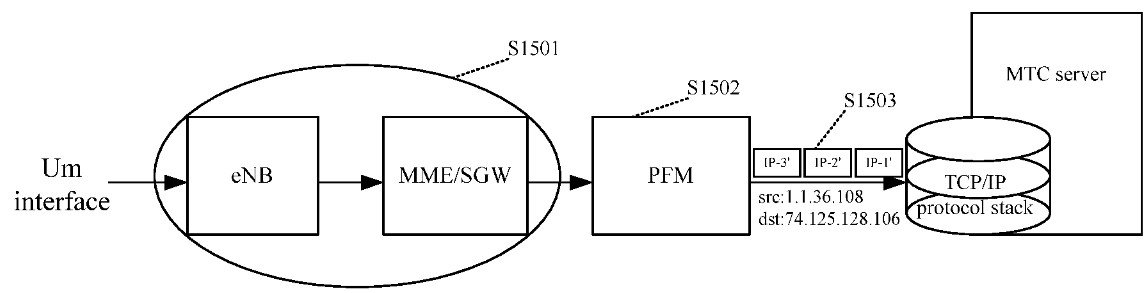
FIG. 15 is a flowchart of fragmenting a packet according to an embodiment herein.

A packet after aggregation having arrived at a network side may have to be fragmented, to be broken up to restore the original discrete small packets. Referring to FIG. 15, an embodiment herein provides a method for fragmenting a packet. FIG. 15 is a flowchart of fragmenting a packet according to an embodiment herein, which corresponds to FIG. 14. The flow shown in FIG. 15 may include steps as follows.

In S1501, a large packet may go through a 3GPP network.

In S1502, a Packet Fragmentation Module (PFM) may serve to break up a large packet after aggregation into a group of the original small packets. Packet Fragmentation may be the inverse of the process at the Packet Aggregation Module (PAM).

In S1503, an IP packet after the fragmentation may be restored and transferred to a related application of an MTC Server, or delivered directly into a TCP/IP protocol stack. As the IP packet is already an original IP packet, an application program on the MTC Server may process the IP packet according to an original flow.

Note that a work scene of the packet aggregation and fragmentation and such a mode of optimization may serve for a goal as follows.

(1) As mentioned, many applications in an Internet of Things may be of a nature of small packet sending. For example, multiple smart cameras may upload data to an MTC server. A large number of small packets may be transferred to a protocol stack at an air interface. A protocol stack at an air interface may be stratified into RLC, MAC, PDCP, etc. Data are encapsulated or packed into packets at each stratum. Data may also be processed stratum by stratum at a network element in a network of an operator. Then, processing such as stratification, header-adding, etc., performed on a large number of small packets may lead to inadequate utilization of a resource of a system. A solution for aggregation herein may effectively enhance utilization of a resource of a 3GPP system in such a scene, namely, implementing a low cost.

(2) UE of an Internet of Things may often be located at a location with poor signal coverage, such as a basement of a building. A radio bearing may have to be established before a data service. More often than not, it may cost even more signaling to establish a radio bearing in an area with a KPI of a network state, due to possible retransmission caused by a signaling sending failure, a refusal, etc. Greater transmit power will be required when a signal is poor. Frequent small data sending may cause higher power consumption by UE. A solution herein may solve the issue by first aggregating small packets to be sent in an area of a poor network state, and sending the aggregated packets when the network state gets better.

The example gives but one mode of aggregation and fragmentation for a PAM and a PFM. There may be various ways of aggregation in terms of program design skills and complexity of implementation. However, basic thought thereof may be the same.

Strategy of Optimizing ACK Transmission by Signaling

Transmission Control Protocol (TCP) is a transmission-stratum protocol based on acknowledgement. Namely, after a packet has arrived at a peer, the peer may have to send an ACK packet to acknowledge reception of the packet. ACK packet sending will impact a rate at which a TCP data flow is transmitted. Based on the principle, an embodiment herein provides a method and module (i.e., the traffic regulator and the traffic regulating module) capable of regulating a downlink rate by controlling uplink TCP ACK sending. A module according to the embodiment may mainly serve for three functions as follows. (1) The module may detect a network state of a present environment, such as a signal strength, quality of the signal, an SNR, etc. (2) The module may boost concurrent rates effectively without boosting transmit power, implementing high performance transmission, as long as a network condition is fair and equipment is fully charged. (3) In a case such as when detecting that the equipment has low battery, etc., the module may limit a downlink rate to lower power consumption without additional increase in buffer space. Note that usually an uplink rate may have to be lower than a downlink rate, and may be controllable by UE. Therefore, the present disclosure focuses on downlink traffic limitation.

Figure 16:
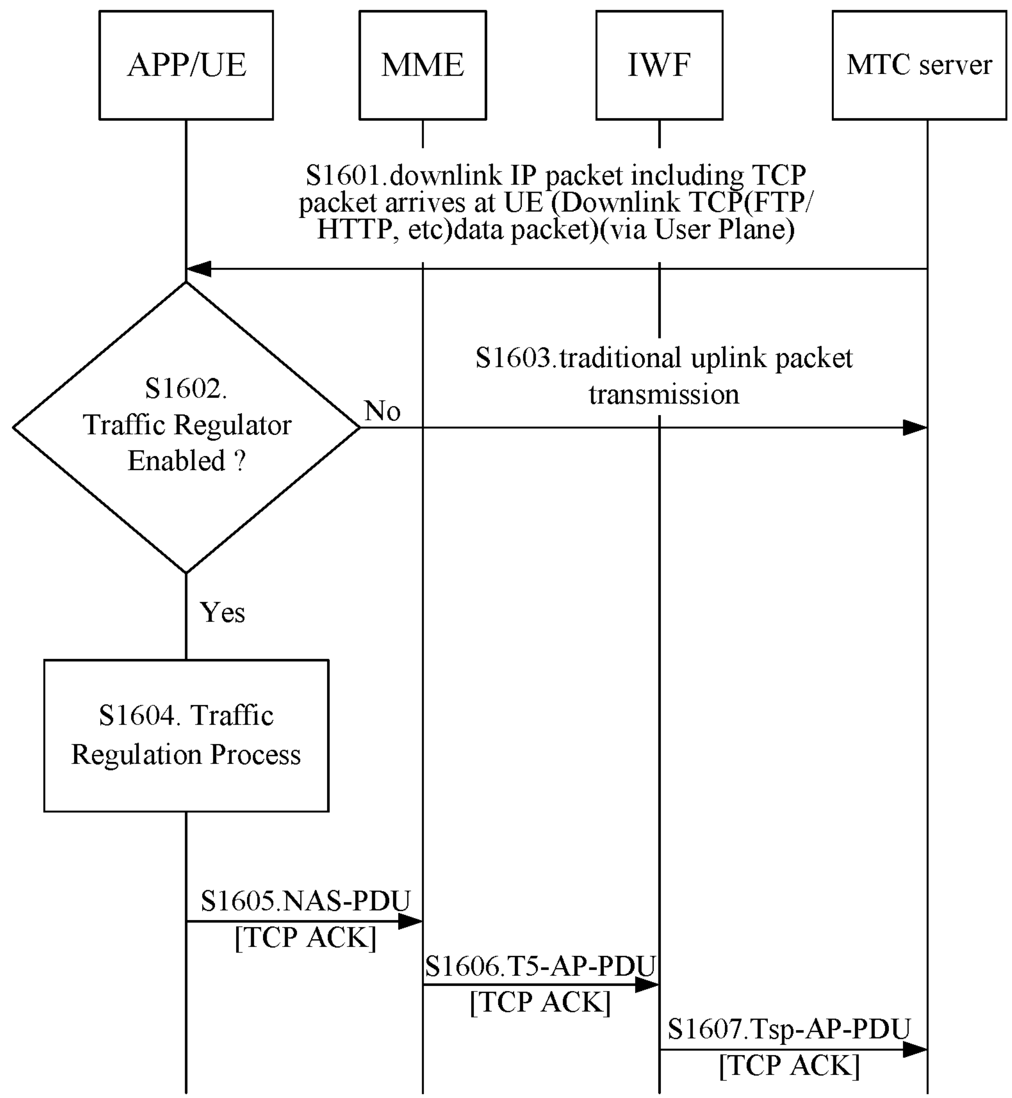
FIG. 16 is a flowchart of a method for transmitting an ACK packet via signaling according to an embodiment herein.

FIG. 16 is a flowchart of a method for transmitting an ACK packet via signaling according to an embodiment herein. The flow may include steps as follows.

In S1601, a downlink IP packet including a TCP packet may arrive at UE.

In S1602, if a traffic regulator is enabled, the flow may go to S1204 to continue with the remaining flow. Otherwise, if the traffic regulator is not enabled, the flow may go to S1203. The traffic regulator may serve to provide a program of a user with an optional function.

In S1603, traditional uplink packet transmission may be performed. Namely, an IP packet encapsulated with TCP may be delivered directly to an air interface side of UE, packed stratum by stratum, and sent to a network via an air interface.

In S1604, a traffic regulating module may detect a KPI of a network reference signal, thus boosting concurrent rates, limiting traffic, and lowering a cost.

In S1605, an uplink TCP ACK message, namely, a message acknowledging a downlink TCP packet, may be packed into an NAS-PDU at a control plane.

In S1606, the NAS message with a message body containing content of the TCP ACK may be transmitted in the network of an operator.

In S1607, a network side may finally deliver the message to a server in an Internet of Things (MTC Server).

Figure 17:
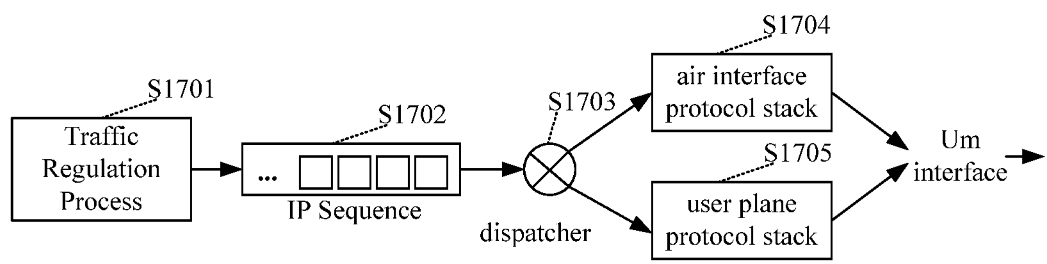
FIG. 17 is a flowchart of work of a traffic regulating module according to an embodiment herein.

A downlink rate of concurrent rates of radio data UE may usually fail to reach an expected standard. A User Datagram Protocol (UDP for short) generally may not have the issue, mainly due to existence of TCP. However, what used most by an application program may still be TCP. A main reason may be that an uplink TCP data flow will occupy most resources, resulting in somewhat delayed upload of an uplink TCP ACK small packet. Such a delay may differ from a delay of a general TCP data load packet. A downlink large packet not acknowledged in time will have a major impact on a downlink peak rate. There are some avoiding and optimizing solutions for such an issue, mainly by increasing cache on UE, making a decision on an uplink packet, and then sending a packet of a small volume first and caching a large packet. Such a solution may have two disadvantages. One may be impact on an uplink rate. The other may be occupation of cache space of UE. Many UE of an Internet of Things may be resource-limited low-end equipment to which the solution may not apply. A technical solution herein is free of the two disadvantages, as a TCP ACK is borne in radio NAS signaling as small data and uploaded to a network, equivalently via an "auxiliary channel", occupying no data in a user plane, without the need to increasing transmit power. In this way, a concurrent downlink rate may be boosted clearly. Likewise, downlink traffic may be limited and power consumption may be lowered by controlling a frequency of delivering TCP ACK packets or encapsulations into a radio protocol stack NAS encapsulating module. Refer to FIG. 17 for a working mechanism thereof.

Traffic Regulation

FIG. 17 is a flowchart of work of a traffic regulating module according to an embodiment herein. As shown in FIG. 17, the flow may include steps as follows.

In S1701, a traffic regulating module may perform traffic regulation in FIG. 16.

In S1702, an IP sequence may contain an ACK packet for an uplink TCP.

In S1703, a dispatcher, may allocate a data flow to a radio protocol stack at an air interface, handed to a NAS stratum for data packing. The data flow may as well, according to a conventional flow, be packed into an RLC PDU, packed stratum by stratum, and then transmitted via a user plane at an air interface. The former is the solution proposed herein. The dispatcher may be designed to enhance compatibility and user option.

In S1704, a protocol stack at an air interface, here in particular a non-radio-access stratum, namely, an NAS stratum, may pack a small packet and transmit the packed small packet by signaling.

In S1705, a packet going through a conventional protocol stack at a user plane will be processed successively by a radio protocol stack of two strata, finally form a radio frame, and sent into a network of a 3GPP system.

The present disclosure may be described below with reference to an application scene.

Consider two application scenes in an Internet of Things to which a technical solution herein may apply. First, when a vehicle passing through a bridge installed with multiple IP cameras, the cameras will take pictures of the vehicle, compress data of the pictures, and upload the compressed data to an application server via an LTE-M network. Vehicle will frequently pass through the bridge during rush hours in the morning and the afternoon. In this case, frequent concurrent small data upload may occur. With the present disclosure, numerous small packets are aggregated before being uploaded, effectively reducing a system load caused by multiple scattered packets. When vehicles are scarce, a vehicle may pass the bridge only every once in a while, in which case the packet aggregation mechanism may effectively avoid individual uploading of each packet, thereby avoiding frequent switches of multiple MTC Devices between an IDLE state and a CONNECT state, reducing a signaling load of a system.

Consider also a scene of onboard UE. Onboard UE may allow a user in a vehicle to access a network to perform an operation such as upload, downloading, etc. Onboard UE may as well update a service such as an advertisement, video, etc., played on a display of the UE by radio downloading. In this way, by using a technical solution herein, transmission energy consumption caused by moving to a weak signal may be avoided, boosting a peak rate for large service transmission while saving a resource, improving user experience.

Note that a module herein may be implemented by software or hardware. Hardware implementation may include, but is not limited to that: the modules may all be located in one processor; or, the modules may be located respectively in multiple processors.

Embodiments herein further provide a storage medium. The storage medium may be arranged for storing a program code for executing steps as follows.

In S11, a first packet to be sent to a server is determined.

In S12, when there are two or more first packets, the two or more first packets are aggregated into a second packet.

In S13, the second packet is sent to the server.

The storage medium may be arranged for storing a program code for executing steps as follows.

In S21, a first packet to be sent to a server is determined.

In S22, when the first packet is an acknowledging (ACK) packet, the ACK packet is sent using a Non-Access-Stratum-Protocol Data Unit (NAS-PDU).

The storage medium may be arranged for storing a program code for executing step as follows.

In S31, a second packet sent by User Equipment (UE) is received.

In S32, two or more first packets aggregated in the second packet are acquired by parsing the second packet.

The storage medium may include, but is not limited to: various media capable of storing a program code, such as a U disk, Read-Only Memory (ROM), Random Access Memory (RAM), a mobile hard disk, a magnetic disk, a CD, etc.

A processor may execute a method according to an embodiment herein according to the program code stored in the storage medium.

Refer to an example described in an aforementioned embodiment herein for an example of the embodiment, which will not be repeated here.

With embodiments herein, working efficiency of a system may be increased effectively, and a cost of the system (including power consumption by UE and a signaling load loss of a 3GPP system) may be lowered.

"packet aggregation" in uplink small packet sending may relieve low efficiency caused by the need to process each of a large number of small packets by a protocol stack stratum by stratum. After the packets are aggregated in to a large packet, instead of processing each original small packet, a radio protocol stack is to process but a header of the large packet. Secondly, existence of an aggregating module allows control of timing of small packet uploading, such that a packet may be sent when a signal is strong, and cached when the signal is weak. The packet aggregation mechanism in effect serves to cache data. Sending data under a weak signal will often lead to issues such as failure of radio link establishment, etc., such that signaling may have to be resent frequently, leading to an increased system load. While sending data after the signal gets better will lower frequency of occurrence of such an issue, lowering a signaling cost of the system as well as power consumption of UE.

A concurrent downlink rate may be controlled and increased by controlling an uplink ACK, based on TCP acknowledgement. A technical solution herein proposes transmitting an ACK packet as a particular small packet contained in NAS signaling, such that the ACK packet occupies no data channel Since an uplink ACK may be fed back quickly, a rate of downlink data too will increase substantially. Concurrent rates may be increased with no boost in transmit power. Likewise, a downlink rate may be controlled by controlling a rate of packing ACKs into the NAS, thereby saving power.

Clearly, those skilled in the art will know that modules or steps in embodiments herein may be realized using a universal computing device, and may be integrated in a single computing device or distributed in a network formed by multiple computing devices. Optionally, they may be realized using computing device executable program codes, and thus may be stored in a storage device and executed by a computing device. In some cases, the steps may be executed in an order different from that illustrated or described here, or may each be made into an Integrated Circuit module. Multiple modules or steps herein may be realized by being made into a single Integrated Circuit module. Thus, an embodiment herein is not limited to a specific combination of hardware and software.

What described are but embodiments herein, and are not intended to limit the present disclosure. Note that various modifications and variations may be devised by those skilled in the art. Any modification, equivalent replacement, improvement, etc., made within the spirit and principle herein should be included in the scope of the present disclosure.

INDUSTRIAL APPLICABILITY

Embodiments herein propose a method and device for sending a packet, and a method and device for receiving a packet. The method for sending a packet includes that: a first packet to be sent to a server is determined; when there are two or more first packets, the two or more first packets are aggregated into a second packet; and the second packet is sent to the server. With embodiments herein, slow data transmission in related art is avoided, thus increasing a data transmission rate.

The invention claimed is:

1. A method for sending a packet, comprising:

determining a first packet to be sent to a server;

in response to there being two or more first packets, aggregating the two or more first packets into a second packet comprising:

translating a source Internet Protocol (IP) address of each of the two or more first packets into a predetermined public IP address, padding different data fields with a same length in the second packet respectively with data in the two or more first packets having gone through source IP address translation, wherein a data field of the different data fields padded with data in the two or more first packets comprises at least one of:

first identification information for identifying a length of the data in a first packet of the two or more first packets, second identification information for identifying the source IP address of the first packet of the two or more first packets before the source IP address translation, or padding bits in response to the length of the data in the first packet of the two or more first packets being less than a length of the data field, a portion in the data field not padded with the data in the two or more first packets is padded with the padding bits, and setting a source IP address of the second packet as the predetermined public IP address; and sending the second packet to the server based on a state of a network over which the second packet is being sent.

2. The method of claim 1, further comprising:

in response to the first packet being an acknowledging (ACK) packet, sending the ACK packet using a Non-Access-Stratum-Protocol Data Unit (NAS-PDU).

3. The method of claim 2, wherein the sending the ACK packet using a Non-Access-Stratum-Protocol Data Unit (NAS-PDU) comprises:

bearing the ACK packet in the NAS-PDU; and sending the NAS-PDU bearing the ACK packet.

4. A method for receiving a packet, comprising:

receiving a second packet sent by User Equipment (UE); and acquiring two or more first packets aggregated in the second packet by parsing the second packet, comprising:

acquiring first identification information comprised in a data field by parsing two or more data fields in the second packet, determining, according to the first identification information, a length of data in a first packet of the two or more first packets with which each of the two or more data fields in the second packet is padded, wherein the first identification information identifies the length of the data in the first packet, acquiring, according to the length of the data in the first packet, the data in the first packet with which each of the two or more data fields in the second packet is padded, and after the parsing two or more data fields in the second packet, determining, according to second identification information comprised in the data field in which the first identification information is comprised, a source Internet Protocol (IP) address of the first packet before source IP address translation, wherein the second identification information identifies the source IP address of the first packet before the source IP address translation.

5. A device for sending a packet, comprising:

a memory storing processor-executable instructions; and a processor arranged to execute the processor-executable instructions to perform steps of:

determining a first packet to be sent to a server;

in response to there being two or more first packets, aggregating the two or more first packets into a second packet comprising:

translating a source Internet Protocol (IP) address of each of the two or more first packets into a predetermined public IP address, padding different data fields with a same length in the second packet respectively with data in the two or more first packets having gone through source IP address translation, wherein a data field of the different data fields padded with data in the two or more first packets comprises at least one of:

first identification information for identifying a length of the data in a first packet of the two or more first packets, second identification information for identifying the source IP address of the first packet of the two or more first packets before the source IP address translation, or padding bits in response to the length of the data in the first packet of the two or more first packets being less than a length of the data field, a portion in the data field not padded with the data in the two or more first packets is padded with the padding bits, and setting a source IP address of the second packet as the predetermined public IP address; and sending the second packet to the server based on a state of a network over which the second packet is being sent.

6. The device of claim 5, the processor is arranged to execute the processor-executable instructions to further perform the following step:

in response to the first packet being an acknowledging (ACK) packet, sending the ACK packet using a Non-Access-Stratum-Protocol Data Unit (NAS-PDU).

7. The device of claim 6, wherein the sending the ACK packet using a Non-Access-Stratum-Protocol Data Unit (NAS-PDU) comprises:

bearing the ACK packet in the NAS-PDU; and sending the NAS-PDU bearing the ACK packet.

* * * * *